(12) United States Patent
Takashige

(10) Patent No.: US 8,445,626 B2
(45) Date of Patent: May 21, 2013

(54) BIAXIALLY ORIENTED NYLON FILM AND PROCESS FOR PRODUCTION OF BIAXIALLY ORIENTED NYLON FILM

(75) Inventor: Masao Takashige, Chuo-ku (JP)

(73) Assignee: Idemitsu Unitech Co., Ltd., Tokyo (JP)

( * ) Notice: Subject to any disclaimer, the term of this patent is extended or adjusted under 35 U.S.C. 154(b) by 0 days.

(21) Appl. No.: 13/339,031

(22) Filed: Dec. 28, 2011

(65) Prior Publication Data

US 2012/0101251 A1     Apr. 26, 2012

Related U.S. Application Data

(63) Continuation of application No. 12/377,421, filed as application No. PCT/JP2007/065700 on Aug. 10, 2007.

(30) Foreign Application Priority Data

Aug. 14, 2006   (JP) .................................. 2006-221051
Aug. 14, 2006   (JP) .................................. 2006-221052
Aug. 14, 2006   (JP) .................................. 2006-221053

(51) Int. Cl.
    *C08G 69/14*     (2006.01)
(52) U.S. Cl.
    USPC ......... 528/323; 264/146; 264/209.5; 264/519
(58) Field of Classification Search
    USPC ................ 528/310, 323; 264/146, 209.5, 519
    See application file for complete search history.

(56) References Cited

U.S. PATENT DOCUMENTS

| 4,978,484 | A |   | 12/1990 | Takashige et al. |
| 5,094,799 | A |   | 3/1992 | Takashige |
| 5,158,637 | A |   | 10/1992 | Takashige et al. |
| 5,925,305 | A | * | 7/1999 | Takashige et al. ............ 264/519 |
| 6,221,502 | B1 | * | 4/2001 | Takashige et al. ......... 428/475.5 |
| 2007/0299219 | A1 | * | 12/2007 | Higashioji et al. ............ 525/535 |

FOREIGN PATENT DOCUMENTS

| EP | 0335411 A2 | 10/1989 |
| EP | 2 455 209 | 5/2012 |
| JP | 02-022032 A | 1/1990 |
| JP | 04-142256 A | 5/1992 |
| JP | H06 23862 | 1/1994 |
| JP | 6-106619 A | 4/1994 |
| JP | 06-114930 A | 4/1994 |
| JP | 10-36665 A | 2/1998 |
| JP | 2000 123800 | 4/2000 |
| JP | 2001-064415 | 3/2001 |
| JP | 3-126523 A | 5/2001 |
| JP | 2001 260215 | 9/2001 |
| JP | 2004-074795 | 3/2004 |
| JP | 2004-098600 | 4/2004 |
| JP | 2004 122767 | 4/2004 |
| JP | 2005 203294 | 1/2007 |
| JP | 2006-221051 | 2/2008 |
| JP | 2006-221053 | 2/2008 |
| JP | 2008044209 | 2/2008 |
| JP | 2008045016 | 2/2008 |

OTHER PUBLICATIONS

International Search Report, PCT/JP2007065700, Sep. 13, 2007, 2pages, Japanese Patent Office.
Supplementary European Search Report of EP 07 79 2345, Place of Search—Munich, Date of Completion—Nov. 23, 2009, 5 pages.
Office Action issued on Mar. 2, 2011 in Chinese Patent Application No. 200780029930.8 by the State Intellectual Property Office, P.R. China, along with translation—(13 pages).
English Translation of Office Action issued on Oct. 4, 2012 in Taiwan Patent Application No. 096129876.
Office Action issued on Oct. 4, 2012 in Taiwan Patent Application No. 096129876.
Shinonome Osami et al., "Biaxially Oriented Polyamide Film," English Abstracts of Japanese Publication No. 02-022032; Publication Date: Jan. 24, 1990; Application No. 63-173149; Filing Date: Jul. 11, 1988; Applicant Unitika Ltd. . (Patent Abstracts of Japan).
Fujimoto Masahiro et al., "Packaging Bag," English Abstracts of Japanese Publication No. 04-142256; Publication Date: May 15, 1992; Application No. 02-255731; Filing Date: Sep. 25, 1990; Applicant Idemitsu Petrochem Co Ltd. (Patent Abstracts of Japan).
Takashige Masao et al. "Manufacture of Breakable Film" English Abstracts of Japanese Publication No. 06-114930; Publication Date: Apr. 26, 1994; Application No. 04-263634; Filing Date: Oct. 1, 1992; Applicant Idemitsu Petrochem Co Ltd. (Patent Abstracts of Japan).
Katsumi, Tanaka, et al. "Wrapping Material for Battery Case"; English Abstracts of Japanese Publication No. JP 2000 123800; Publication Date: Apr. 28, 2000; Application No. 10-293435; Filing Date: Oct. 15, 1998; Applicant: Showa Alum Corp. (Patent Abstracts of Japan).
Nobuhiro, Ide et al. "Producing Method for Vessel Consisting of Crystalline Polyester Sheet"; English Abstracts of Japanese Publication No. JP 2001 260215; Publication Date: Sep. 25, 2001; Application No. 200-070438, Filing Date: Mar. 14, 2000. Applicant: Toyobo Co Ltd. (Patent Abstracts of Japan).
Ryosuke, Matsui et al. "Biaxially Oriented Polyester Film for Vessel Molding, Vessel, and Vessel Molding Process"; English Abstracts of Japanese Publication No. JP 2004 122767; Publication Date: Apr. 22, 2004; Application No. 2003-299845; Filing Date: Aug. 25, 2003. Applicant: Toray Ind. Inc. (Patent Abstracts of Japan).

(Continued)

*Primary Examiner* — Gregory Listvoyb
(74) *Attorney, Agent, or Firm* — Millen, White, Zelano & Branigan, P.C.

(57) ABSTRACT

Biaxially-oriented nylon film according to the present invention is biaxially-oriented nylon film made from nylon. In the biaxially-oriented nylon film, an elongation ratio of the film in each of four directions (an MD direction, a TD direction, a 45 degree direction and a 135 degree direction) until a film rupture is 70 percent or more, the elongation ratio being measured in a tensile test (testing conditions: a sample width is 15 mm; a distance between gauge points is 50 mm; and a tensile speed is 100 mm/min), and a stress ratio A ($\sigma_1/\sigma_2$) between a tensile stress $\sigma_1$ and a tensile stress $\sigma_2$ in a stress-strain curve obtained in the tensile test of the film is 2 or more in each of the four directions, the tensile stress $\sigma_1$ being a value at a point where the elongation ratio becomes 50 percent while the tensile stress $\sigma_2$ being a value at an yield point.

4 Claims, 2 Drawing Sheets

OTHER PUBLICATIONS

Katsuo, Awamori et al. "Apparatus and Method of Wirelessly Transmitting Image", English Abstracts of Japanese Application No. 2005-203294, Filing Date: Dec. 7, 2005, Publication No. 2007-027874; Publication Date: Jan. 2, 2007. Applicant: Komatsu Ltd. (Patent Abstracts of Japan).

Takashige, Masao, "Biaxially Stretched Nylon Film, Laminated Packaging Material and Method of Biaxially Stretched Nylon Film"; English Abstracts of Japanese Application No. 2006-221051; Filing Date: Aug. 14, 2006; Publication No. 2008-044209; Publication Date: Feb. 28, 2008; Applicant: Idemitsu Unitech Co Ltd. (Patent Abstracts of Japan).

Takashige, Masao, "Biaxially Oriented Nylon Film, Laminated Packaging Material and Method for Producing Biaxially Oriented Nylon Film"; English Abstracts of Japanese Application No. 2006-221053; Filing Date: Aug. 14, 2006; Publication No. 2008-045016; Publication Date: Feb. 28, 2008; Applicant: Idemitsu Unitech Co Ltd. (Patent Abstracts of Japan).

Tsutomu, Aso et al. "Production of Polybutylene Terephthalate Resin Container"; English Abstracts of Japanese Publication No. JP 06-23862; Publication Date: Jan. 2, 1994; Application No. 04-202936; Filing Date: Jul. 7, 1992; Applicant: Shin Etsu Polymer Co Ltd. (Patent Abstracts of Japan).

* cited by examiner

BIAXIALLY ORIENTED NYLON FILM AND PROCESS FOR PRODUCTION OF BIAXIALLY ORIENTED NYLON FILM

This application is a continuation of U.S. patent application Ser. No. 12/377,421, filed Feb. 13, 2009, which is incorporated by reference herein, which in turn is a U.S. National Stage Filing under 35 U.S.C. §371 of International Patent Application No. PCT/JP2007/065700, filed on Aug. 10, 2007, and published as WO 2008/020569 A1 on Feb. 21, 2008.

TECHNICAL FIELD

The present invention relates to biaxially-oriented nylon film, a laminated packing material and a manufacturing method for the biaxially-oriented nylon film.

BACKGROUND ART

Biaxially-oriented nylon film (hereinafter also referred to as ONy film), which is excellent in strength, impact resistance and anti-pinhole property, is frequently used for packaging a product such as a heavy product or liquid product on which a great load is applied.

There has been conventionally known a technique to use nylon for a packing material used in such a forming as a deep-drawing, a stretch forming or the like (see e.g. Patent Document 1, Patent Document 2).

Specifically, Patent Document 1 discloses resin sheet for cold forming that includes: a base material layer that contains a polystyrene-based resin; and a functional layer that is single-layered or two-layered on both surfaces or one surface of the base material layer. In addition, according to Patent Document 1, as the functional layer, an abrasion resistance layer that contains a nylon resin is provided on an exterior layer of the resin sheet for cold forming.

According to such resin sheet for cold forming, a cool-formed article that is excellent in impact resistance and shape-retaining property can be obtained. By providing the abrasion resistance layer containing the nylon resin on the exterior layer of the sheet, the exterior layer of the sheet can be prevented from being damaged during cool-forming.

As described in Patent Document 1, as compared with hot-forming, cool-forming is excellent in that a size of an apparatus can be reduced with a heater being omitted and that a continuous forming at high speed can be realized.

On the other hand, Patent Document 2 discloses composite sheet for deep-drawing that is formed by laminating plural pieces of sheet that includes a seal layer, a middle layer and an outer layer. In the sheet, the seal layer includes a polypropylene-based resin layer, the middle layer includes an oxygen-barrier resin layer, a nylon-based resin layer and a polyethylene-based resin layer, and the outer layer is made from a hygroscopic material.

According to such composite sheet for deep-drawing, the composite sheet can be given a mechanical strength by providing the nylon-based resin layer in the middle layer. With this arrangement, an occurrence of a pinhole during deep-drawing at approximately 150 degrees C. can be prevented.
[Patent Document 1] JP-A-2004-74795
[Patent Document 2] JP-A-2004-98600

DISCLOSURE OF THE INVENTION

Problems to be Solved by the Invention

However, since there is no detailed description in Patent Document 1 with respect to the nylon-based resin layer provided on the exterior layer of the resin sheet for cold-forming, the resin sheet may not show a favorable formability, strength or anti-pinhole property for cold-forming, depending on the nylon resin layer used therein. In such a case, a molded article of a sharp shape may not be obtained, and a pinhole may be formed in the sheet during cool-forming.

In Patent Document 2, although there is a detailed description with respect to a material used for forming the nylon-based resin layer, there is no detailed description with respect to mechanical property such as an elongation ratio of the nylon-based resin layer. In addition, although referring to deep-forming at approximately 150 degrees C., Patent Document 2 does not refer to cool-forming. Accordingly, as in Patent Document 1, a favorable molded article may not be obtained by cool-forming.

An object of the present invention is to provide, as a main base material for packing material used in cool-forming etc., biaxially-oriented nylon film that is excellent in formability, strength and anti-pinhole property, a laminated packing material including the same and a manufacturing method of the biaxially-oriented nylon film.

Means for Solving the Problems

According to a finding on which the present invention is based, biaxially-oriented nylon film (ONy film) that is excellent in formability, strength and anti-pinhole property can be obtained when predetermined conditions are satisfied with respect to an elongation ratio until a rupture in each four directions (an MD direction, a TD direction, a 45 degrees direction and a 135 degrees direction) obtained in a tensile test of the ONy film and to a tensile stress $\sigma_1$ at a point where the elongation ratio becomes 50 percent and tensile stress $\sigma_2$ at an yield point in a stress-strain curve obtained in the tensile test of the film.

In short, according to the present invention, biaxially-oriented nylon film described as follows is provided.

Biaxially-oriented nylon film according to an aspect of the present invention is biaxially-oriented nylon film made from nylon 6, in which an elongation ratio of the film in each of four directions (an MD direction, a TD direction, a 45 degree direction and a 135 degree direction) until a film rupture is 70 percent or more, the elongation ratio being measured in a tensile test (testing conditions: a sample width is 15 mm; a distance between gauge points is 50 mm; and a tensile speed is 100 mm/min), and a stress ratio A ($\sigma_1/\sigma_2$) between a tensile stress $\sigma_1$ and a tensile stress $\sigma_2$ in a stress-strain curve obtained in the tensile test of the film is 2 or more in each of the four directions, the tensile stress $\sigma_1$ being a value at a point where the elongation ratio becomes 50 percent while the tensile stress $\sigma_2$ being a value at an yield point.

According to the aspect of the present invention, since the elongation ratio until the rupture in each of the four directions obtained in the tensile test of the ONy film is 70 percent or more and the stress ratio A in the stress-strain curve of the ONy film is 2 or more in each of the directions, the ONy film is excellent in formability, strength and anti-pinhole property, which is specifically favorable in cold-forming. According to a laminated packing material formed to contain such ONy film, no pinhole is formed in the ONy film during cold deep-drawing or the like, thereby manufacturing a molded article of a sharp shape.

In the present invention, cold-forming refers to forming that is conducted under an atmosphere at a temperature less than a glass transition point (Tg) of a resin. Preferably in cool-forming, using a cool-forming machine for forming aluminum foil, a sheet material is forced into a female die by a male die to be pressed at high speed. In this manner, without being heated, the sheet material can experience such a plastic deformation as molding, bending, shearing and drawing.

In the biaxially-oriented nylon film according to the aspect of the present invention, it is preferable that a crystallinity degree of the film is in a range of 20 to 38 percent.

According to the aspect of the present invention, since the crystallinity is in the range of 20 to 38 percent, the film exhibits a favorable elongation property during forming.

In the biaxially-oriented nylon film according to the aspect of the present invention, it is preferable that the film is made from a film forming material that contains a virgin material and a thermal hysteresis material, the virgin material being formed of nylon 6 (hereinafter also referred to as Ny6) and metaxylylene adipamide (hereinafter also referred to as MXD6), the thermal hysteresis material being obtained by melt-kneading Ny6 and MXD6 and by setting the MXD6 to have a melt point of 233 to 238 degrees C., and a hydrothermal shrinkage factor of the film is 3 to 20 percent in each of the MD direction and the TD direction of the film when the film is retained in hot liquid of 95 degrees C. for thirty minutes.

According to the aspect of the present invention, since the hydrothermal shrinkage factor of the film when the film is retained in the hot liquid of 95 degrees C. for thirty minutes is in the range of 3 to 20 percent, the film exhibits a favorable elongation property during forming.

According to a laminated packing material formed to contain such ONy film, since MXD6 is contained in the ONy film, the laminated packing material exhibits an excellent heat resistance. Accordingly, when the packing material having been formed by laminating an ONy film layer and a sealant layer is heated by a seal bar to be seal-treated, the packing material does not adhere to the seal bar, whereby a favorable seal-treatment can be realized. Further, according to the packing material, since the ONy film layer contains the thermal hysteresis material, an occurrence of an intra-layer separation inside the ONy film layer can be prevented, whereby a molded article that is excellent in impact resistance can be obtained.

In the biaxially-oriented nylon film according to the aspect of the present invention, it is preferable that the Ny6 and the MXD6 are contained in the virgin material by ratios of 60 to 85 parts by mass and 15 to 40 parts by mass respectively, and a content of the thermal hysteresis material is 5 to 40 percent by mass of the total amount of the film forming material.

In the biaxially-oriented nylon film according to the aspect of the present invention, it is preferable that the Ny6 and the MXD6 are contained in the thermal hysteresis material by ratios of 60 to 85 parts by mass and 15 to 40 parts by mass respectively.

In the biaxially-oriented nylon film according to the aspect of the present invention, it is preferable that a ratio ($A_{max}/A_{min}$) between a maximum stress ratio $A_{max}$ and a minimum stress ratio $A_{min}$ of the stress ratios A obtained with respect to the four directions is 2 or less.

In the biaxially-oriented nylon film according to the aspect of the present invention, it is preferable that a tensile-rupture strength of the film in each of the four directions measured in the tensile test of the film is 180 MPa or more.

A laminated packing material according to another aspect of the present invention is a laminated packing material that includes the above-described biaxially-oriented nylon film.

A method of manufacturing biaxially-oriented nylon film according to still further aspect of the present invention is a manufacturing method of biaxially-oriented nylon film made from nylon 6, the method including steps of: biaxially-orienting unoriented raw film made from the nylon 6 under a condition where an oriented ratio of the film in each of an MD direction and a TD direction becomes 2.8 times or more; and heat-treating the raw film at a temperature between 205 and 215 degrees C. to manufacture biaxially-oriented nylon film, in which an elongation ratio of the film in each of four directions (the MD direction, the TD direction, a 45 degree direction and a 135 degree direction) until a film rupture is 70 percent or more, the elongation ratio being measured in a tensile test (testing conditions: a sample width is 15 mm, a distance between gauge points is 50 mm; and a tensile speed is 100 mm/min), and a stress ratio A ($\sigma_1/\sigma_2$) of a tensile stress $\sigma_1$ and a tensile stress $\sigma_2$ in a stress-strain curve obtained in the tensile test of the film is 2 or more in each of the four directions, the tensile stress $\sigma_1$ being a value at a point where the elongation ratio becomes 50 percent while the tensile stress $\sigma_2$ being a value at an yield point.

A method of manufacturing biaxially-oriented nylon film according to still further aspect of the present invention is a manufacturing method of biaxially-oriented nylon film made from a film forming material that contains nylon 6, the method including steps of: biaxially-orienting unoriented raw film made from the nylon 6 under a condition where an oriented ratio of the film in each of an MD direction (a direction in which the film is moved) and a TD direction (a direction of a film width) becomes 2.8 times or more; and heat-treating the raw film at a temperature between 160 and 200 degrees C. to manufacture biaxially-oriented nylon film, in which a crystallinity degree of the film is in a range of 20 to 38 percent, an elongation ratio of the film in each of four directions (the MD direction, the TD direction, a 45 degree direction and a 135 degree direction) until a film rupture is 70 percent or more, the elongation ratio being measured in a tensile test (testing conditions: a sample width is 15 mm; a distance between gauge points is 50 mm; and a tensile speed is 100 mm/min), and a stress ratio A ($\sigma_1/\sigma_2$) of a tensile stress $\sigma_1$ and a tensile stress $\sigma_2$ in a stress-strain curve obtained in the tensile test of the film is 2 or more in each of the four directions, the tensile stress $\sigma_1$ being a value at a point where the elongation ratio becomes 50 percent while the tensile stress $\sigma_2$ being a value at an yield point.

A method of manufacturing biaxially-oriented nylon film according to still further aspect of the present invention is a manufacturing method of biaxially-oriented nylon film made from a film forming material that contains a virgin material and a thermal hysteresis material, the virgin material being formed of Ny6 and MXD6, the thermal hysteresis material being obtained by melt-kneading Ny6 and MXD6 and by setting the MXD6 to have a melt point of 233 to 238 degrees C., the method including steps of: biaxially-orienting unoriented raw film made from the nylon 6 under a condition where an oriented ratio of the film in each of an MD direction (a direction in which the film is moved) and a TD direction (a direction of a film width) becomes 2.8 times or more; and heat-treating the raw film at a temperature between 160 and 200 degrees C. to manufacture biaxially-oriented nylon film, in which a hydrothermal shrinkage factor of the film is 3 to 20 percent in each of the MD direction and the TD direction of the film when the film is retained in hot liquid of 95 degrees C. for thirty minutes, an elongation ratio of the film in each of four directions (the MD direction, the TD direction, a 45 degree direction and a 135 degree direction) until a film rupture is 70 percent or more, the elongation ratio being measured in a tensile test (testing conditions: a sample width is 15 mm; a distance between gauge points is 50 mm; and a tensile speed is 100 mm/min), and a stress ratio A ($\sigma_1/\sigma_2$) of a tensile stress $\sigma_1$ and a tensile stress $\sigma_2$ in a stress-strain curve obtained in the tensile test of the film is 2 or more in each of the four directions, the tensile stress $\sigma_1$ being a value at a point where the elongation ratio becomes 50 percent while the tensile stress $\sigma_2$ being a value at an yield point.

BEST MODE FOR CARRYING OUT THE INVENTION

First Embodiment

A first embodiment of the present invention will be described in detail below.
[Arrangement of Biaxially-Oriented Nylon Film]
Biaxially-oriented nylon film (ONy film) according to the present embodiment is formed by biaxially-orienting unoriented raw film made from nylon 6 (hereinafter called, Ny6) and heat-treating the oriented raw film at a predetermined temperature. By biaxially-orienting the unoriented raw film as described above, ONy film excellent in impact resistance can be obtained.

The chemical formula of the Ny6 is represented by Formula 1 below.

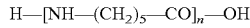

H—[NH—(CH$_2$)$_5$—CO]$_n$—OH

In the present embodiment, an elongation ratio, a stress ratio A and a tensile-rupture stress of the ONy film in each four directions (MD direction, TD direction, 45 degree direction and 135 degree direction) until a tensile rupture of the film are obtained based on a stress-strain curve obtained through a tensile test (a sample width of 15 mm, a distance between gauges points of 50 mm and a tensile speed of 100 mm/min) conducted on the ONy film.

Figure 1:
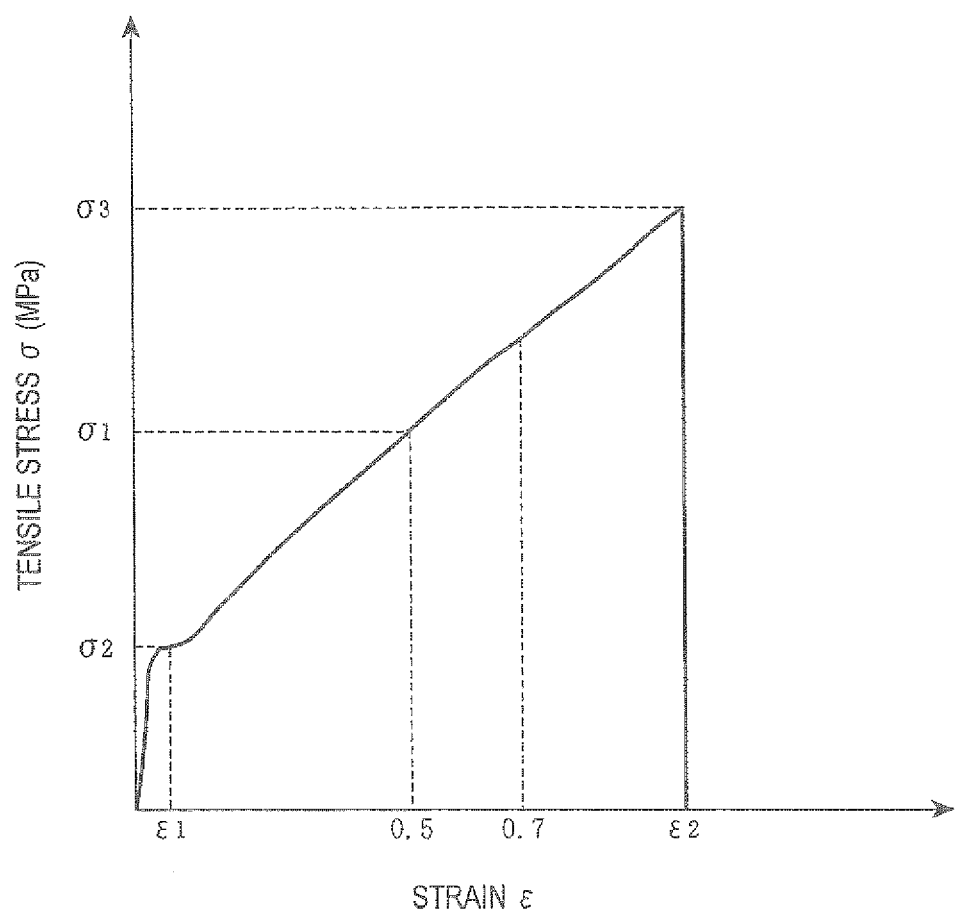
FIG. 1 is a graph showing an example of a stress-strain curve obtained when a tensile test is conducted on ONy film according to a first and third embodiments of the present invention.

An example of the stress-strain curve obtained through the tensile test is shown in FIG. 1.

In FIG. 1, the vertical scale shows a tensile stress $\sigma$ (MPa) of the ONy film while the horizontal scale shows a strain $\epsilon$ of the ONy film ($\epsilon = \Delta l/l$, in which l represents an initial length of the film and $\Delta l$ represents an increment in the film length). By conducting the tensile test on the ONy film, the tensile stress $\sigma$ is increased in such a manner as to substantially satisfy a direct function in accordance with an increase in the strain $\epsilon$, such that an increasing trend of the tensile $\sigma$ at a predetermined strain $\epsilon_1$ is greatly changed. In the present embodiment, the point ($\epsilon_1, \sigma_2$) is defined as an yield point. When the strain $\epsilon$ is further increased, the tensile stress $\sigma$ is also increased accordingly. When the strain $\epsilon$ is increased up to a predetermined strain $\epsilon_2$, the film is ruptured. Stress-strain curves corresponding respectively to the four directions (MD direction, TD direction, 45 degrees direction and 135 degrees direction) are obtained per one piece of the ONy film.

In the ONy film according to the present embodiment, the elongation ratios in the four directions (the MD direction, the TD direction, the 45 degrees direction and the 135 degrees direction) until the film rupture in the tensile test are required to be 70 percent or more. In other words, as in the stress-strain curve shown in FIG. 1, the strain $\epsilon_2$ at the time of the film rupture is required to be 0.7 or more. With this arrangement, the ONy film can be stretched in a balanced manner, thereby improving a drawing-formability of the ONy film when the ONy film is formed to be a laminate material. When the elongation ratio in one of the four directions is less than 70 percent, the film can be easily ruptured in a cold deep-drawing operation, whereby a good formability is not obtained.

It is more preferable that a value obtained by dividing a maximum elongation ratio by a minimum elongation ratio out of the elongation ratios in the four directions is 2.0 or less. With this arrangement, the ONy film can be stretched in a further balanced manner.

In addition, it is preferable that the elongation ratios of the ONy film in the four directions are 75 percent or more and that the value obtained by dividing the maximum elongation ratio by the minimum elongation ratio out of the elongations ratios in the four directions is 2.0 or less, whereby a further excellent formability can be obtained.

In the ONy film according to the present embodiment, a stress ratio A ($\sigma_1/\sigma_2$) between the tensile stress $\sigma_1$ when the elongation ratio becomes 50 percent (strain $\epsilon$=0.5) and the tensile stress $\sigma_2$ at the yield point in the stress-strain curve exemplarily shown in FIG. 1 is required to be 2 or more (more preferably 2.2 or more) in each of the four directions. With this arrangement, a formation of a pinhole during the cold deep-drawing operation can be reliably prevented, whereby a molded article of a sharp shape can be manufactured. When the stress ratio A is less than 2 in one of the directions, a film thickness may be uneven with the film being partially thinned, whereby the film may be ruptured.

A ratio ($A_{max}/A_{min}$) between a maximum stress ratio $A_{max}$ and a minimum stress ratio $A_{min}$ out of the stress ratios A in the four directions is preferably 2.0 or less (more preferably 1.8 or less). With this arrangement, the film can be stretched in a balanced manner during a cold forming operation, whereby a molded article with a uniform thickness can be manufactured. When the ratio $A_{max}/A_{min}$ is more than 2.0, the film thickness may be uneven with the film being partially thinned, whereby the film may be ruptured.

Further, in the ONy film according to the present embodiment, a tensile-rupture strength ($\sigma_3$) in each of the four directions is preferably 180 MPa or more in the stress-strain curve exemplarily shown in FIG. 1. With this arrangement, a sufficient processing strength can be obtained, whereby the ONy film can be more invulnerable to rupture in the cold deep-forming operation or the like. At this time, a value obtained by dividing a maximum strength by a minimum strength out of the tensile-rupture strengths in the four directions is preferably 2.0 or less, whereby a well-balanced processing strength can be obtained.

It is preferable that the tensile-rupture strengths of the ONy film in the four directions are 200 MPa or more and that the value obtained by dividing the maximum strength by the minimum strength out of the tensile-rupture strengths in the four directions is preferably 1.8 or less, whereby a better-balanced processing strength can be obtained.
[Manufacturing Method of ONy Film]
The above-described ONy film can be obtained by biaxially-orienting the unoriented raw film made from Ny6 under a condition where an oriented ratio in each of the MD direction and the TD direction becomes 2.8 times or more and by heat-treating the oriented raw film at a temperatures between 205 and 215 degrees C.

As a method of biaxial orienting, a simultaneous biaxial-orienting or a sequential biaxial-orienting such as a tubular method or a tenter method can be employed. However, in light of a strength balance between a lengthwise direction and a widthwise direction, it is preferable to perform the simultaneous biaxial-orienting according to the tubular method.

Specifically, the ONy film according to the present embodiment can be manufactured as follows.

After Ny6 pellets are melt-kneaded in an extruder at 270 degrees C., a molten material is extruded from a die in a shape of cylindrical film. By subsequently quenching the extruded molten material by water, a raw film is prepared.

Figure 2:
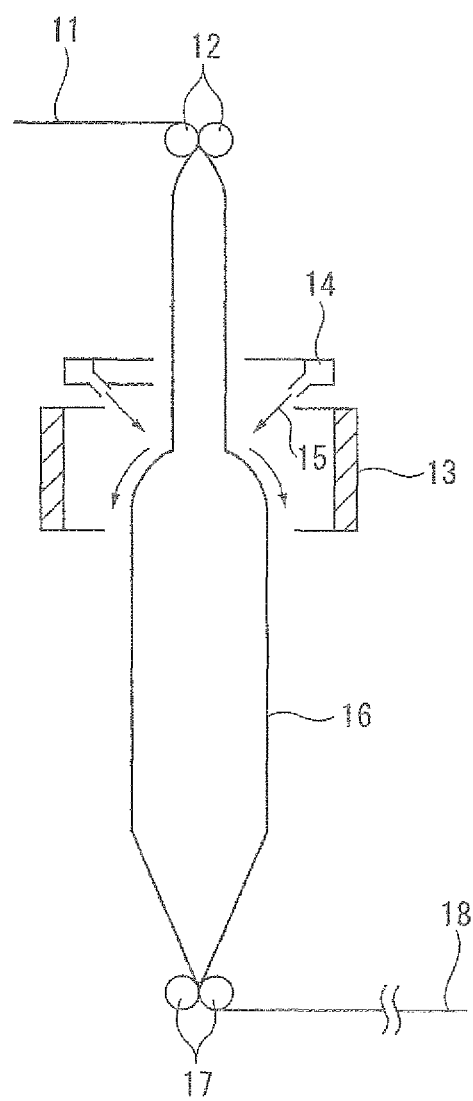
FIG. 2 is an illustration schematically showing a biaxially-orienting apparatus for manufacturing the ONy film according to the first and third embodiments of the present invention.

Then, as exemplarily shown in FIG. 2, after inserted between a pair of nip rollers 12, the raw film 11 is heated by a heater 13 while a gas is injected into the raw film 11. The raw film 11 is applied with air 15 from an air ring 14 at a drawing start point to be distended to form a bubble 16. By pulling the raw film 11 using a pair of nip rollers 17 provided at a downstream side, the simultaneous biaxial orienting in the MD direction and the TD direction according to the tubular method is performed. At this time, the oriented ratio in each of the MD direction and the TD direction is required to be 2.8 times or more. When the oriented ratio is less than 2.8 times, an impact strength is deteriorated, which is practically unfavorable.

Subsequently, the oriented film is put into a tenter heat treat furnace (not shown) to be heat-fixed at 205 to 215 degrees C., whereby ONy film 18 according to the present embodiment is obtained. When a heat-treating temperature is higher than 215 degrees C., due to an excessive growth of a bowing phenomenon, an anisotropy in a width direction is increased while a crystallinity degree is excessively increased, whereby the strength is deteriorated. On the other hand, when the heat-treating temperature is lower than 205 degrees C., due to an excessive increase in a film shrinkage factor, the film may be easily shrunk during a secondary processing.

[Arrangement of Laminated Packing Material]

A laminated packing material according to the present embodiment is formed by laminating onto at least one surface of the ONy film another laminate base material of one layer or of two layers or more. Specifically, the other laminate base material may be exemplarily a film that includes an aluminum layer or the like.

Generally, a laminated packing material including the aluminum layer is not suitable for cool forming because the aluminum layer can be easily ruptured due to necking during a cool forming operation. In this regard, in the laminated packing material according to the present embodiment, since the ONy film is excellent in a formability, impact resistance and anti-pinhole property, the aluminum layer can be prevented from being ruptured during a cool stretch-expanding operation or a cool deep-drawing operation, thereby preventing a pinhole formation in the packing material. Accordingly, even when the total thickness of the packing material is small, a molded article of a sharp shape with high strength can be obtained.

The total thickness of the laminated packing material according to the present embodiment (i.e., a sum of thicknesses of the ONy film and the other laminate base material) is preferably 200 µm or less. When the total thickness is more than 200 µm, corner portions of the packing material may not be easily formed by cool forming, whereby a molded article of a sharp shape may not be obtained.

The thickness of the ONy film in the laminated packing material according to the present embodiment is preferably 5 to 50 µm, more preferably 10 µm to 30 µm. When the thickness of the ONy film is less than 5 µm, impact resistance of the laminated packing material may be deteriorated, whereby a sufficient cool formability may not be obtained. On the other hand, when the thickness of the ONy film is more than 50 µm, impact resistance of the laminated packing material may not be further improved even though the total thickness of the packing material is increased, which is unfavorable.

As the aluminum layer used in the laminated packing material according to the present embodiment, aluminum foil formed from pure aluminum or from a soft material of aluminum-iron alloy may be used. In order to improve laminate property, the aluminum foil preferably experiences a pretreatment such as an undercoating treatment by silane coupling agent or titanium coupling agent, a corona discharge treatment and the like, such that the pretreated aluminum foil is laminated onto the ONy film.

A thickness of the aluminum layer is preferably 20 to 100 µm. With this arrangement, a shape of the molded article can be well-maintained, and oxygen, moisture and the like can be prevented from being permeated through the packing material.

When the thickness of the aluminum layer is less than 20 µm, the aluminum layer may be easily ruptured during the cool forming of the laminated packing material. Even when the aluminum layer is not ruptured, a pinhole or the like may be easily formed. Thus, oxygen, moisture and the like may be permeated through the packing material. On the other hand, when the thickness of the aluminum layer is more than 100 µm, neither the rupture during the cool forming nor a formation of the pinhole is notably prevented even though the total thickness of the packing material is increased, which is unfavorable.

Second Embodiment

A second embodiment of the present invention will be described in detail below.

In the description of the second embodiment, what has been already described in the preceding first embodiment will not be repeated.

[Arrangement of Biaxially-Oriented Nylon Film]

Biaxially-oriented nylon film (ONy film) according to the present embodiment is formed by biaxially-orienting unoriented raw film made from a material containing Ny6 and heat-treating the oriented raw film at a predetermined temperature, as in the first embodiment.

Unlike the first embodiment, the ONy film preferably has a crystallinity degree of 20 to 38 percent, more preferably 24 to 36 percent. With this arrangement, ONy film that is excellently stretchable during a forming operation as compared with general ONy film can be obtained, whereby the rupture of the ONy film and the formation of the pinhole can be prevented during, for example, the cool forming operation. When the crystallinity degree of the film is less than 20 percent, there is no particular difference in the stretchability during the forming operation between the ONy film and general ONy film. On the other hand, when the crystallinity degree of the film is more than 38 percent, a cool drawing-formability and an impact strength may be deteriorated.

[Manufacturing Method of ONy Film]

The ONy film according to the present embodiment can be obtained by biaxially-orienting the unoriented raw film made from the material containing Ny6 under the condition where the oriented ratio in each of the MD direction and the TD direction becomes 2.8 times or more and by heat-treating the oriented raw film, as in the first embodiment.

However, although the heat-treating is performed at the temperature between 205 and 215 degrees C. in the first embodiment, the heat-treating is performed at a temperature between 160 and 200 degrees C. in the present embodiment.

Specifically, the oriented film is put into a tenter heat treat furnace (not shown) to be heat-fixed at 160 to 200 degrees C., whereby ONy film 18 according to the present embodiment is obtained.

[Arrangement of Laminated Packing Material]

The laminated packing material according to the present embodiment is prepared in the same manner as in the first embodiment, a description of which is omitted.

Third Embodiment

A third embodiment of the present invention will be described in detail below.

In the description of the third embodiment, what has been already described in the preceding embodiments will not be repeated.

[Arrangement of Biaxially-Oriented Nylon Film]

Biaxially-oriented nylon film (ONy film) according to the present embodiment is formed by biaxially-orienting unoriented raw film made from a material containing: a virgin material formed from Ny6 and MXD6; and a thermal hysteresis material formed by melt-kneading Ny6 and MXD6, and by heat-treating the oriented raw film at a predetermined temperature. By biaxially-orienting the unoriented raw film as described above, ONy film excellent in impact resistance can be obtained.

The chemical formula of the Ny6 is represented by Formula 2 below while the chemical formula of the MXD6 is represented by Formula 3 below.

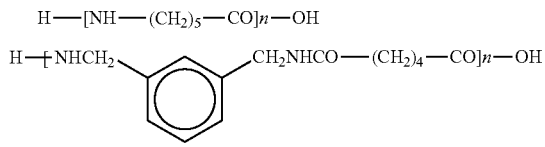

The above-mentioned virgin material generally means a material other than a mixture material having a history where the Ny6 and the MXD6 have been mixed to be melt-kneaded. For instance, even when the Ny6 or the MXD6 in a material individually has a melt-kneading history (e.g., a recycled product), the material is the virgin material as long as the Ny6 and the MXD6 are not mixed to be melt-kneaded.

In light of the impact strength and the heat resistance of the ONy film, the Ny6 and the MXD6 are preferably contained in the virgin material by a ratio of 60 to 85 parts by mass (Ny6):15 to 40 parts by mass (MXD6). When the MXD6 in the virgin material is less than 15 parts by mass, the heat resistance is deteriorated. Accordingly, when the laminated packing material, in which suitable sealant film is laminated onto the ONy film, is seal-treated, the laminated packing material may adhere to a seal bar. On the other hand, when the MXD6 is more than 40 parts by mass, the impact strength is so much deteriorated as to impair practical usability.

The above-mentioned thermal hysteresis material means a material containing Ny6 and MXD6, the material having passed through an extruder. In the present invention, as the MXD 6, MXD6 whose melt point is maintained within a range of 233 to 238 degrees C. (preferably within a range of 235 to 237 degrees C.) is used, the melt point being measured with a differential scanning calorimetry (DSC). The thermal hysteresis material may be prepared by recycling the ONy film obtained in the present invention. Since the thermal hysteresis material serves as a compatible solubilizer that has an affinity for both the Ny6 and the MXD6, an intra-layer separation of the ONy film can be prevented by adding the thermal hysteresis material to the ONy film.

The intra-layer separation means a phenomenon where a separation is induced inside the ONy film when the ONy film onto which suitable sealant film has been laminated is used under such severe conditions as in the cool forming. The mechanism of the intra-layer separation has not been completely specified. However, it is speculated that the Ny6 and the MXD6 are layer-oriented in the ONy film and the intra-layer separation occurs between layers.

The melt point of the MXD6 in the thermal hysteresis material means a melt point measured before the thermal hysteresis material is melt-kneaded with the virgin material. When the melt point of the MXD6 in the thermal hysteresis material is less than 233 degrees C. the impact strength of the ONy film is deteriorated. When the melt point of the MXD6 in the thermal hysteresis material is 238 degrees C. or more, the intra-layer separation may not be favorably prevented.

A content of the thermal hysteresis material is preferably 5 to 40 percent by mass of the total amount of the ONy film forming material. When the thermal hysteresis material is less than 5 percent by mass, the intra-layer separation can be easily induced when the ONy film is used under such severe conditions as in the cool forming after the ONy film is formed into a laminated film. When the thermal hysteresis material is more than 40 percent by mass, the impact strength of the ONy film may be deteriorated.

In light of the impact strength and a prevention of the intra layer separation, the Ny6 and the MXD6 is preferably contained in the thermal hysteresis material by a ratio of 60 to 85 parts by mass (Ny6):15 to 40 parts by mass (MXD6). When a content ratio of the MXD6 in the thermal hysteresis material is less than 15 parts by mass (i.e., a content ratio of the Ny6 is more than 85 parts by mass), the intra-layer separation of the ONy film may not be favorably prevented. When the content ratio of the MXD6 in the thermal hysteresis material is more than 40 parts by mass (i.e., the content ratio of the Ny6 is less than 60 parts by mass), the impact strength of the ONy film may be deteriorated.

The ONy film according to the present embodiment is required to have a hydrothermal shrinkage factor of 3 to 20 percent in the MD direction and the TD direction of the film respectively (preferably 6 to 20 percent) when the film is retained in hot liquid of 95 degrees C. for thirty minutes. With this arrangement, ONy film that is excellently stretchable during the forming operation as compared with general ONy film can be obtained, whereby the rupture of the ONy film and the formation of the pinhole can be prevented during, for example, the cool forming operation. When the hydrothermal shrinkage factor of the film is less than 3 percent, there is no particular difference in the stretchability during the forming operation between the ONy film and general ONy film. On the other hand, when the hydrothermal shrinkage factor of the film is more than 20 percent, a delamination may occur between the ONy film and the other film layer when the other film layer is laminated to the ONy film to form the laminated packing material.

[Manufacturing Method of ONy Film]

The ONy film according to the present embodiment can be obtained by biaxially orienting the unoriented raw film made from the material containing the virgin material and the thermal hysteresis material by a predetermined mixture ratio under the condition where the oriented ratio in each of the MD direction and the TD direction becomes 2.8 times or more and by heat-treating the oriented raw film at a temperature between 160 and 200 degrees C. The virgin material and the thermal hysteresis material are made from the Ny6 and the MXD6.

As a method of biaxial orienting, a simultaneous biaxial-orienting or a sequential biaxial-orienting such as a tubular method or a tenter method can be employed. However, in light of a strength balance between a lengthwise direction and a widthwise direction, it is preferable to perform the simultaneous biaxial-orienting according to the tubular method.

In order to prepare the Ny6 and the MXD6 contained in the virgin material, it is preferable to use and dry-blend pelleted Ny6 and pelleted MXD6. In addition, it is preferable to use pelleted thermal hysteresis material. For example, the pellets may be prepared by cutting the biaxially-oriented nylon film obtained according to the present embodiment into small pieces and compressing the cut film. With this arrangement, the thermal hysteresis material can be favorably dry-blended with the Ny6 pellets and the MXD6 pellets.

Specifically, the ONy film according to the present embodiment can be manufactured as follows.

After the Ny6 pellets, the MXD6 pellets and the pelleted thermal hysteresis material are melt-kneaded in an extruder at 270 degrees C. a molten material is extruded from a die in a shape of cylindrical film. The extruded molten material is subsequently quenched by water, whereby a raw film is obtained.

Then, as exemplarily shown in FIG. 2, after inserted between the pair of nip rollers 12, the raw film 11 was heated by the heater 13 while a gas was injected into the raw film 11. The raw film 11 was applied with the air 15 from the air ring 14 at the drawing start point to be distended to form the bubble 16. By pulling the raw film 11 using the pair of nip rollers 17 provided at the downstream side, the simultaneous biaxial orienting in the MD direction and the TD direction according to the tubular method was performed. At this time, the oriented ratio in each of the MD direction and the TD direction is required to be 2.8 times or more. When the oriented ratio is less than 2.8 time, an impact strength is deteriorated, which is practically unfavorable.

Subsequently, the oriented film is put into a tenter heat treat furnace (not shown) to be heat-fixed at 160 to 200 degrees C., whereby ONy film 18 according to the present embodiment is obtained.

[Arrangement of Laminated Packing Material]

The laminated packing material according to the present embodiment is prepared in the same manner as in the first embodiment, a description of which is omitted.

However, the laminated packing material according to the present invention contains the MXD 6 in the ONy film layer as well as the components of the laminated packing material according to the first embodiment, thereby exhibiting an excellent heat resistance. Accordingly, when the packing material includes a sealant layer, the packing material does not adhere to the seal bar when heated by the seal bar to be seal-treated, whereby a favorable seal-treatment is realized.

According to the packing material, since the ONy film layer contains the thermal hysteresis material, no intra-layer separation occurs inside the ONy film layer during the cool forming operation, so that a molded article that is excellent in impact resistance can be obtained.

<Modification>

Although the best arrangements etc. for implementing the present invention has been described in the first to third embodiments, the present invention is not limited thereto. In other words, while the present invention has been described with reference to the specific embodiments, various modifications may be made to the above described embodiments by those of ordinary skill in the art without departing from the spirit and scope of the invention.

Therefore, the description that limits the materials, the layer arrangements and the like is only an example to make the invention easily understood, but is not intended to limit the invention, so that the invention includes the description using a name without a part of or all of the limitation on the material etc.

For example, although the tubular method is employed as the method of biaxial orienting in the first to third embodiments, the tenter method may be used. In addition, the method of orienting may be performed by the simultaneous biaxial orienting or by the sequential biaxial orienting.

The ONy film may be added with any necessary additives as desired. Such additives exemplarily include an anti-blocking agent (such as inorganic filler), a water repellant (such as ethylene-bis-stearate ester) or a lubricant (such as calcium stearate).

Although the laminated packing material in which the aluminum layer etc. is laminated to the ONy film is exemplified in the above described embodiments, the arrangement is not limited thereto. In the laminated packing material according to the present invention, various functional layers such as a sealant layer, an antistatic layer, a print layer, a barrier layer, a reinforcing layer and the like may be laminated.

EXAMPLE

Next, the first to third embodiments will be described in detail by reference to examples and comparative examples. It should be noted that the present invention is not limited to or by the examples described below.

Examples of First Embodiment

Examples 1, 2

(Manufacturing of Oriented Film)

After Ny6 pellets were melt-kneaded in an extruder at 270 degrees C., a molten material was extruded from a die in a shape of cylindrical film. The extruded molten material was subsequently quenched by water, whereby a raw film was obtained. As the Ny6, nylon 6 manufactured by Ube Industries, Ltd. [UBE NYLON 1023FD (trade name), relative viscosity: $\eta r=3.6$] was used.

Then, as shown in FIG. 2, after inserted between the pair of nip rollers 12, the raw film 11 was heated by the heater 13 while a gas was injected into the raw film 11. The raw film 11 was applied with the air 15 from the air ring 14 at the drawing start point to be distended to form the bubble 16. By pulling the raw film 11 using the pair of nip rollers 17 provided at the downstream side, the simultaneous biaxial orienting in the MD direction and the TD direction according to the tubular method was performed. The oriented ratios at the time of the orienting were respectively 3.0 times (in the MD direction) and 3.2 times (in the TD direction).

Subsequently, the oriented film was put into a tenter heat treat furnace (not shown) and heat-fixed at 210 degrees C., whereby ONy film 18 (hereinafter, also referred to as ONy film 18) according to the present examples was obtained. The ONy film was 15 μm thick in Example 1 while the ONy film was 25 μm thick in Example 2.

[Evaluation Method]

(Tensile Test)

A tensile test of the ONy film 18 was conducted with a tester manufactured by Instron Corporation (Tester Type: 5564) under conditions: a sample with of 15 mm; a distance between fasteners of 50 mm; and a tensile speed of 100 mm/min. Measurements were conducted on the ONy film 18 with respect to the MD direction, the TD direction, the 45 degrees direction and the 135 degrees direction. Based on the stress-strain curves obtained with respect to the directions of the ONy film, respective rupture elongation ratios (percent) in the directions, a ratio between a maximum value and a minimum value of the rupture elongation ratios, the respective stress ratios A in the directions ($A=\sigma_1/\sigma_2$, in which $\sigma_1$ represents a tensile stress when the elongation rate is 50 percent while $\sigma_2$ represents a tensile stress at the yield point) and the ratio between the maximum value $A_{max}$ and the minimum value $A_{min}$ of the stress ratios A were obtained.

(Drawing Formability)

Drawing formability of the laminated packing material including the ONy film 18 was evaluated.

Specifically, the laminated packing material was prepared by: using the ONy film 18 according to each of Examples 1 and 2 as a front base material film; using L-LDPE film (UNILAX LS-711C (trade name), manufactured by Idemitsu Unitech CO., LTD, thickness of 120 μm) as a sealant film; and dry-laminating the ONy film 18 and the L-LDPE film. As an adhesive for dry-laminating, a blend of TAKELAC A-615 and TAKENATE A-65 (both of which are manufactured by Mitsui Takeda Chemicals, Inc.) was used (blend ratio: 16/1). The laminated packing material after the films were dry-laminated experienced an aging treatment at 40 degrees C. for three days.

The laminated packing materials manufactured as described above experienced a cold deep-drawing (at a normal temperature), in which a rectangular die in plan view (5 mm-by-10 mm) was used. Each of the laminated packing materials experienced the deep-drawing ten times, and the number of occurrences of a defect such as a pinhole, a crack and the like was examined. When no defect occurred in any of ten times deep-drawing, the laminated packing material was rated as A. When such a defect occurred one to two times out of ten times, the laminated packing material was rated as B, when three to five times, rated as C, and when six times or more rated as D.

(Piercing Strength)

A measurement of a piercing strength was conducted by: piercing the ONy film 18 with a needle of 1 mmϕ at a piercing speed of 200 mm/min; and measuring a strength (N) required for the needle to pierce the film.

(Impact Strength)

A measurement of an impact strength was conducted with a film impact tester (manufactured by Toyo Seiki Seisaku-sho, Ltd.) by: striking fixed ONy film 18 of a ring shape with a semispherical pendulum (diameter of ½ inch); and measuring an impact strength (kg/cm) required for punching the film. Incidentally, the impact strength is represented in absolute value, The larger the value is, the more excellent impact resistance of the film is evaluated to be.

Comparative Example 1

After the Ny6 pellets were melt-kneaded in the extruder at 270 degrees C., the molten material was extruded from T-die. The extruded molten material was subsequently contact-cooled by a chill roller, whereby unoriented raw film was manufactured. Incidentally, as the extruder, a single-screwed extruder of 50 mmϕ was used.

Next, the unoriented raw film was stretched to three times the original size in the MD direction while being heated at 100 degrees C. by a heating roller of a stretching device (compact biaxial stretching device, manufactured by Nikkou Seisaku-sho Corporation). Immediately thereafter, the unoriented raw film was stretched to 3.2 times the original size in the TD direction with both ends thereof being grasped by a tenter device.

Then, the oriented film was put into a tenter heat treat furnace (not shown) and heat-fixed at 210 degrees C., whereby Ny film that was biaxially stretched in a sequential manner (thickness: 15 μm) according to Comparative Example 1 was obtained.

Comparative Example 2

After the Ny6 pellets were melt-kneaded in the extruder at 270 degrees C., the molten material was extruded from T-die. The extruded molten material was subsequently contact-cooled by a chill roller, whereby unoriented raw film was manufactured. Incidentally, as the extruder, a single-screwed extruder of 50 mmϕ was used.

Then, using a biaxially stretching device (manufactured by Nikkou Seisaku-sho Corporation), the unoriented raw film was stretched to 3.0 times the original size both in the MD and TD directions while being heated at 120 degrees C.

Additionally, the oriented film was heat-fixed by an oven at 210 degrees C., whereby Ny film that was biaxially stretched in a simultaneous manner (thickness: 15 μm) according to Comparative Example 2 was obtained.

The same evaluation test was conducted on Comparative Examples 1 and 2 as was conducted on Examples 1 and 2.

Table 1 shows results of the tensile tests conducted on Examples 1 and 2 and Comparative Examples 1 and 2, Table 2 shows evaluation results of the drawing formability, the piercing strength and the impact strength observed in each of Examples 1 and 2 and Comparative Examples 1 and 2.

TABLE 1

| | Thickness [μm] | Rupture Elongation Ratio (%) | | | | | Stress Ratio A | | | | | Rupture Strength [MPa] | | | | |
|---|---|---|---|---|---|---|---|---|---|---|---|---|---|---|---|---|
| | | MD | TD | 45 degrees | 135 degrees | Ratio max/min | MD | TD | 45 degrees | 135 degrees | Ratio Amax/Amin | MD | TD | 45 degrees | 135 degrees | Ratio max/min |
| Example 1 | 15 | 141 | 114 | 133 | 130 | 1.24 | 2.5 | 3.38 | 2.64 | 2.86 | 1.35 | 251 | 283 | 267 | 278 | 1.13 |
| Example 2 | 25 | 155 | 109 | 137 | 120 | 1.42 | 2.11 | 3.77 | 2.65 | 2.82 | 1.79 | 265 | 299 | 284 | 262 | 1.14 |
| Comparative Example 1 | 15 | 87.5 | 79.4 | 79.4 | 98.5 | 1.24 | 2.8 | 2.89 | 4.21 | 1.9 | 2.2 | 228 | 225 | 342 | 170 | 2.01 |
| Comparative Example 2 | 15 | 127 | 66.9 | 78 | 112 | 1.9 | 1.55 | 5.13 | 4.13 | 1.9 | 3.31 | 210 | 346 | 316 | 223 | 1.65 |

TABLE 2

|  | Drawing Formability | Piercing Strength | Impact Strength [kg/cm] 23 degrees C. |
|---|---|---|---|
| Example 1 | B | 10 | 12.5 |
| Example 2 | B | 15.4 | Not Break※ |
| Comparative Example 1 | D | 9.5 | 8.1 |
| Comparative Example 2 | D | 9.5 | 10 |

※The film was not ruptured although measured as in Example 1.

[Evaluation Result]

As shown in Table 1, the ONy film 18 according to Examples 1 and 2 is excellent in each of the deep-drawing formability, the piercing strength and the impact strength as compared with Comparative Examples 1 and 2.

On the other hand, since Comparative Examples do not satisfy the above-described conditions, there are problems with properties of the ONy film 18 according to each of Comparative Examples.

Specifically, according to Comparative Example 1, the stress ratio A in the 135 degrees direction is less than 2, the ratio ($A_{max}/A_{min}$) of the stress ratio A is more than 2, and the rupture strength in the 135 degrees direction is less than 180 MPa. Thus, the film according to Comparative Example 1 exhibits an inferior drawing formability, a relatively low piercing strength and an inferior impact strength.

On the other hand, according to Comparative Example 2, the rupture elongation ratio in the TD direction is less than 70 percent, the stress ratios A in the MD and 135 degrees directions are less than 2, and the ratio ($A_{max}/A_{min}$) of the stress ratio A is more than 2. Thus, the film according to Comparative Example 2 exhibits an inferior drawing formability and a relatively low piercing strength.

Examples of Second Embodiment

Next, the second embodiment will be described in detail by reference to examples and comparative examples.

In the examples of the second embodiment, what has been already described in the examples of the preceding embodiment will not be repeated.

Examples 3 to 5

(Manufacturing of Oriented Film)

an extrusion of Ny6 pellets and an orientation of film were performed as in Examples 1 and 2.

Subsequently, the oriented film was put into a tenter heat treat furnace (not shown) and heat-fixed at 195 degrees C., whereby ONy film 18 (hereinafter, also referred to as ONy film 18) according to Example 3 was obtained. A crystallinity degree of the film according to Example 3 was 33 percent and the film thickness was 15 μm.

ONy film 18 according to Example 4 was manufactured under the same conditions as in Example 3 except that the oriented film was heat-fixed at 160 degrees C. by the tenter test treat furnace. A crystallinity degree of the film according to Example 4 was 21 percent and the film thickness was 15 μm.

ONy film 18 according to Example 5 was manufactured in substantially the same conditions as in Example 3. A thickness of the ONy film 18 was 25 μm and a crystallinity degree of the ONy film 18 was 33 percent.

[Evaluation Method]

A tensile test and evaluation methods of a drawing formability and a piercing strength in the present embodiment were the same as in the first embodiment, a description of which is omitted.

(Impact Strength)

A measurement of an impact strength was conducted with the film impact tester (manufactured by Toyo Seiki Seisaku-sho, Ltd.) by: striking fixed ONy film 18 of a ring shape with the semispherical pendulum (diameter of ½ inch); and measuring an impact strength (kg/cm) required for punching the film. Incidentally, the impact strength is represented in absolute value. The larger the value is, the more excellent impact resistance of the film is evaluated to be.

Comparative Example 3

ONy film 18 according to Comparative Example 3 was manufactured under the same conditions as in Example 3 except that the oriented film was heat-fixed at 210 degrees C. in the tenter heat treat furnace. A crystallinity degree of the film according to Comparative Example 3 was 41 percent and the film thickness was 15 μm.

Comparative Example 4

ONy film 18 according to Comparative Example 4 was manufactured under the same conditions as in Example 3 except that the oriented film was heat-fixed at 210 degrees C. in the tenter heat treat furnace. A crystallinity degree of the film according to Comparative Example 4 was 40 percent and the film thickness was 15 μm.

Comparative Example 5

ONy film 18 according to Comparative Example 5 was manufactured under the same conditions as in Example 5 except that the oriented film was heat-fixed at 210 degrees C. in the tenter heat treat furnace. A crystallinity degree of the film according to Comparative Example 5 was 41 percent and the film thickness was 25 μm.

The same evaluation test was conducted on Comparative Examples 3 to 5 as was conducted on Examples 3 to 5.

Table 3 shows the heat-treating temperature, the crystallinity degree, a hydrothermal shrinkage factor (a hydrothermal shrinkage factor of the film in the MD and TD directions when the film was retained in hot liquid of 95 degrees C. for thirty minutes) and the film thickness respectively in Examples 3 to 5 and Comparative Examples 3 to 5. Table 4 shows results of the tensile tests conducted on Examples 3 to 5 and Comparative Examples 3 to 5. Table 5 shows evaluation results of the drawing formability, the piercing strength and the impact strength (23 degrees C., −10 degrees C. and −30 degrees C.) observed in each of Examples 3 to 5 and Comparative Examples 3 to 5.

TABLE 3

|  | Heat-Treating Temperature [° C.] | Crystallinity Degree[%] | Hydrothermal Shrinkage Factor [%] | Thickness [μm] |
|---|---|---|---|---|
| Example 3 | 195 | 33 | 5 | 15 |
| Example 4 | 160 | 21 | 19 | 15 |
| Example 5 | 195 | 33 | 5 | 25 |
| Comparative Example 3 | 210 | 41 | 2 | 15 |

TABLE 3-continued

| | Heat-Treating Temperature [° C.] | Crystallinity Degree[%] | Hydrothermal Shrinkage Factor [%] | Thickness [μm] |
|---|---|---|---|---|
| Comparative Example 4 | 210 | 40 | 2 | 15 |
| Comparative Example 5 | 210 | 41 | 2 | 25 |

TABLE 4

| | Rupture Elongation Ratio (%) | | | | | Stress Ratio A | | | | | Rupture Strength [MPa] | | | | |
|---|---|---|---|---|---|---|---|---|---|---|---|---|---|---|---|
| | MD | TD | 45 degrees | 135 degrees | Ratio max/min | MD | TD | 45 degrees | 135 degrees | Ratio Amax/Amin | MD | TD | 45 degrees | 135 degrees | Ratio max/min |
| Example 3 | 114 | 102 | 123 | 97 | 1.27 | 2.67 | 3.00 | 3.44 | 2.94 | 1.29 | 297 | 333 | 312 | 313 | 1.12 |
| Example 4 | 109 | 81 | 98 | 99 | 1.35 | 2.83 | 4.53 | 3.87 | 3.29 | 1.60 | 306 | 360 | 351 | 338 | 1.18 |
| Example 5 | 123 | 93 | 114 | 103 | 1.32 | 2.67 | 3.00 | 3.44 | 2.94 | 1.29 | 297 | 338 | 348 | 307 | 1.17 |
| Comparative Example 3 | 87.5 | 79.4 | 79.4 | 98.5 | 1.24 | 2.80 | 2.89 | 4.21 | 1.90 | 2.20 | 228 | 225 | 342 | 170 | 2.01 |
| Comparative Example 4 | 141 | 114 | 133 | 130 | 1.24 | 2.50 | 3.38 | 2.64 | 2.86 | 1.35 | 251 | 283 | 267 | 278 | 1.13 |
| Comparative Example 5 | 102 | 114 | 159 | 65 | 2.45 | 3.07 | 2.48 | 1.76 | 5.43 | 3.19 | 269 | 274 | 240 | 364 | 1.39 |

TABLE 5

| | Drawing Formability | Piercing Strength [N] | Impact Strength [kg/cm] | | |
|---|---|---|---|---|---|
| | | | 23° C. | minus 10° C. | minus 30° C. |
| Example 3 | A | 11.7 | 13.5 | 11.5 | 10.2 |
| Example 4 | A | 12 | 14.2 | 12.5 | 11.4 |
| Example 5 | A | 17.4 | Not Break※ | 16.5 | 17.8 |
| Comparative Example 3 | D | 9.5 | 8.1 | 6.5 | 5.8 |
| Comparative Example 4 | C | 10 | 12.5 | 10.2 | 7 |
| Comparative Example 5 | D | 15.1 | 12.7 | 11 | 11.9 |

※"Not Break" means the film was strong enough to withstand a rupture.

[Evaluation Result]

As shown in Table 3, the ONy film 18 according to each of Examples 3 to 5 is excellent in each of the drawing formability, the piercing strength and the impact strength as compared with Comparative Examples 3 to 5.

On the other hand, since Comparative Examples do not satisfy the above-described conditions, there are problems with properties of the ONy film 18 according to each of Comparative Examples.

Specifically, according to Comparative Example 3, the crystallinity degree is less than 20 percent, the stress ratio A in the 135 degrees direction is less than 2, the ratio ($A_{max}/A_{min}$) of the stress ratio A is more than 2, and the rupture strength in the 135 degrees direction is less than 180 MPa. Thus, the film according to Comparative Example 3 has an inferior drawing formability, a relatively low piercing strength and an inferior impact strength.

According to Comparative Example 4, since the crystallinity degree is less than 20 percent, the film according to Comparative Example 4 has an inferior drawing formability.

According to Comparative Example 5, the rupture elongation ratio in the 135 degrees direction is less than 70 percent, the value obtained by dividing the maximum elongation ratio by the minimum elongation ratio out of the elongation ratios in the four directions is more than 2, the stress ratio A in 45 degrees is less than 2 and the ratio ($A_{max}/A_{min}$) of the stress ratio A is more than 2. Thus, the film according to Comparative Example 5 has an inferior drawing formability.

Examples of Third Embodiment

Next, the Third embodiment will be described in detail by reference to examples and comparative examples.

In the examples of the third embodiment, what has been already described in the examples of the preceding embodiments will not be repeated.

Examples 6, 7

(Manufacturing of Oriented Film)

A mixture of Ny6 pellets and MXD6 pellets in which the pellets were mixed by a ratio of 70 parts by mass (Ny6) to 30 parts by mass (MXD6) was added with a thermal hysteresis material in a form of pellets by a ratio of 10 percent by mass of the total amount of the film forming material, in the thermal hysteresis material, the Ny6 and the MXD6 had been once melt-mixed by the aforesaid ratio of 70 parts by mass (Ny6) to 30 parts by mass (MXD6). After the dry-blended material was melt-kneaded in an extruder at 270 degrees C., a molten material was extruded from a die in a shape of cylindrical film. The extruded molten material was subsequently quenched by water, whereby a raw film was obtained.

A melt point of the MXD6 was measured with a differential scanning calorimetry (DSC) (manufactured by PerkinElmer Corporation) by raising a temperature from 50 degrees C. to 280 degrees C. at a speed of 10 degrees C. per minute. In each of Examples, a value of the first run was employed as the melt point.

As the Ny6, nylon 6 (manufactured by Ube Industries, Ltd. [UBE nylon 1023FD (trade name), relative viscosity: ηr=3.6]) was used. As the MXD6, metaxylylene adipamide (manufactured by Mitsubishi Gas Chemical Company, INC., [MX nylon 6007 (trade mark), relative viscosity ηr=2.7]) was used.

As the thermal hysteresis material, a material that had been extruded at 270 degrees C. using a 40φ EX single screw (manufactured by Yamaguchi Manufacture Works, LTD.) was used, the material containing the Ny6 and the MXD6 by the mixing ratio of 70 parts by mass to 30 parts by mass.

Then, as shown in FIG. 2, after inserted between the pair of nip rollers 12, the raw film 11 was heated by the heater 13 while a gas was injected into the raw film 11. The raw film 11 was applied with the air 15 from the air ring 14 at the drawing start point to be distended to form the bubble 16. By pulling the raw film 11 using the pair of nip rollers 17 provided at the downstream side, the simultaneous biaxial orienting in the MD direction and the TD direction according to the tubular method was performed. The oriented ratios at the time of the orienting were respectively 3.0 times (in the MD direction) and 3.2 times (in the TD direction).

Subsequently, the oriented film was put into a tenter heat treat furnace (not shown) and heat-fixed at 200 degrees C., whereby ONy film 18 (hereinafter, also referred to as ONy film 18) according to Example 6 was obtained, the ONy film 18 having a thickness of 15 μm and a hydrothermal shrinkage factor of 3.4 percent.

ONy film 18 according to Example 7 was manufactured under the same conditions as in Example 6 except that the thermal hysteresis material was added by 20 percent by mass of the total amount of the film forming material and that the oriented film was heat-fixed in the tenter heat treat furnace at 160 degrees C. A crystallinity degree of the film according to Example 7 was 19 percent and the film thickness was 15 μm.

[Evaluation Method]

A tensile test and an evaluation method of a drawing formability in the present embodiment were the same as in the first embodiment, a description of which is omitted.

(Inner Separation)

A laminated packing material was prepared in a manner as described in the section of the evaluation method of the drawing formability. Stripe specimens of 15 mm width were cut off from the laminated packing material. Each end thereof was boundary-separated by hands by several centimeters, such that a front base material film (ONy film 18) and a sealant film were separated. Subsequently, the film specimens each were set in a tension tester (Instron Universal Tester, Type: 1123) to experience a separation test for laminated portions at a speed of 300 mm per minute (90 degrees separation).

Since a peel-strength is dramatically degraded when an intra-layer separation occurs inside the front base material film during the separation test, the occurrence of the intra-layer separation can be determined by observing whether or not such a behavior is present. For example, when the peel-strength radically decreases from approximately 7 N/m (value when the separation test is started) to approximately 1 to 2 N/m in the middle of the separation test, an occurrence of an intra-layer separation can be determined.

Then, film that had showed no behavior of intra-layer separation inside the front base material film was rated as "B" while film that had showed a behavior of intra-layer separation was rated as "D".

(Seal Resistance)

A laminated packing material was prepared in a manner as described in the section of the evaluation method of the drawing formability. The laminated packing material was seal-treated, The seal-treatment was conducted under the following conditions: a temperature of a seal bar was 200 degrees C.; a seal with was 5 mm (no teflon (Registered Trademark) tape was attached); a sealing time was 10 seconds; and a pressure by the seal bar was 2 kg/cm². In evaluating the seal resistance of laminated packing materials, laminated materials that had not adhered to the seal bar when seal-treated under the above-described conditions were rated as "B", laminated materials that had adhered to the seal bar at that time were rated as "C", and laminated materials that had adhered to the seal bar to experience an appearance whitening at that time were rated as "D".

Comparative Example 6

ONy film 18 according to Comparative Example 6 was manufactured under the same conditions as in Example 6 except that thermal hysteresis material was contained by 15 percent by mass of the total amount of the film forming material and that the oriented film was heat-fixed at 210 degrees C. in the tenter heat treat furnace. A hydrothermal shrinkage factor of the film according to Comparative Example 6 was 2.8 percent and the film thickness was 15 μm.

Comparative Example 7

ONy film 18 according to Comparative Example 7 was manufactured under the same conditions as in Example 6 except that only Ny6 was used in the film forming material and that the oriented film was heat-fixed at 195 degrees C. in the tenter heat treat furnace. A hydrothermal shrinkage factor of the film according to Example 7 was 5 percent and the film thickness was 15 μm.

The same evaluation test was conducted on Comparative Examples 6 and 7 as was conducted on Examples 6 and 7.

Table 6 shows the film forming material, the content of the thermal hysteresis material, the heat-treating temperature and the hydrothermal shrinkage factor of Examples 6 and 7 and Comparative Examples 6 and 7. Table 7 shows results of the tensile tests conducted on Examples 6 and 7 and Comparative Examples 6 and 7. Table 8 shows evaluation results of the drawing formability, the inner-separation and the seal resistance observed in each of Examples 6 to 7 and Comparative Examples 6 to 7.

TABLE 6

|  | Material [% by mass] | | Thermal Hysteresis Material | Heat-Treating | Hydrothermal | Thickness |
|---|---|---|---|---|---|---|
|  | Ny6 | MXD6 | Content [% by mass] | Temperature [° C.] | Shrinkage Factor [%] | [μm] |
| Example 6 | 70 | 30 | 10 | 200 | 3.4 | 15 |
| Example 7 | 70 | 30 | 20 | 160 | 19 | 15 |
| Comparative Example 6 | 70 | 30 | 15 | 210 | 2.8 | 15 |
| Comparative Example 7 | 100 | 0 | 0 | 195 | 5 | 15 |

TABLE 7

| | Rupture Elongation Ratio (%) | | | | | Stress Ratio A | | | | | Rupture Strength [MPa] | | | | |
|---|---|---|---|---|---|---|---|---|---|---|---|---|---|---|---|
| | MD | TD | 45 degrees | 135 degrees | Ratio max/min | MD | TD | 45 degrees | 135 degrees | Ratio Amax/Amin | MD | TD | 45 degrees | 135 degrees | Ratio max/min |
| Example 6 | 100 | 103 | 112 | 101 | 1.12 | 2.75 | 2.63 | 2.50 | 2.59 | 1.10 | 296 | 286 | 292 | 295 | 1.04 |
| Example 7 | 86 | 94 | 88 | 93 | 1.09 | 3.65 | 3.10 | 2.80 | 2.50 | 1.46 | 338 | 306 | 316 | 326 | 1.10 |
| Comparative Example 6 | 103 | 119 | 119 | 116 | 1.16 | 2.42 | 1.90 | 1.74 | 2.05 | 1.39 | 240 | 208 | 236 | 223 | 1.15 |
| Comparative Example 7 | 114 | 102 | 123 | 97 | 1.27 | 2.67 | 3.00 | 3.44 | 2.94 | 1.29 | 297 | 333 | 312 | 313 | 1.12 |

TABLE 8

| | Drawing Formability | Intra-Layer Separation | Seal Resistance |
|---|---|---|---|
| Example 6 | A | B | B |
| Example 7 | A | B | B |
| Comparative Example 6 | D | B | B |
| Comparative Example 7 | A | B | D |

[Evaluation Result]

As shown in Table 6, the ONy film 18 according to Examples 6 and 7 is excellent in each of the drawing formability, the inner-separation and the seal resistance as compared with Comparative Examples 6 to 7.

On the other hand, since Comparative Examples do not satisfy the above-described conditions, there are problems with properties of the ONy film 18 according to each of Comparative Examples. Specifically, according to Comparative Example 6, since the stress ratios in the TD and 45 degrees directions are less than 2 percent, the film according to Comparative Example 6 is inferior in the drawing formability. The film according to Comparative Example 7, which does not contain MXD6 in the film forming material, is inferior in the seal resistance.

The invention claimed is:

1. A biaxially-oriented film comprising:
   a nylon film comprising nylon 6 and metaxylylene adipamide,
   wherein said film has an elongation ratio in each of the machine direction, transverse direction, a 45 degree direction and a 135 degree direction, until a film rupture is 70 percent or more, the elongation ratio being measured in a tensile test, wherein the testing conditions include: a sample width of 15 mm; a distance between gauge points of 50 mm; and a tensile speed of 100 mm/min, and
   a stress ratio A ($\sigma_1/\sigma_2$) between a tensile stress $\sigma_1$ and a tensile stress $\sigma_2$ in a stress-strain curve obtained in the tensile test of the film is 2 or more in each of the four directions, the tensile stress $\sigma_1$ being a value at a point where the elongation ratio becomes 50 percent while the tensile stress $\sigma_2$ being a value at an yield point,
   wherein said film is made from a film forming material that contains a virgin material and a thermal hysteresis material, the virgin material being formed of nylon 6 and metaxylylene adipamide, the thermal hysteresis material being obtained by melt-kneading nylon 6 and metaxylylene adipamide and by setting the metaxylylene adipamide to have a melt point of 233 to 238 degrees C., and
   a hydrothermal shrinkage factor of said film is 3 to 20 percent in each of the machine direction and the transverse direction of said film when said film is retained in hot liquid of 95 degrees C. for thirty minutes,
   wherein the nylon 6 and metaxylylene adipamide are contained in the virgin material at ratios of 60 to 85 parts by mass and 15 to 40 parts by mass, respectively, and the content of the thermal hysteresis material is 5 to 40 percent by mass of the total amount of the film forming material.

2. The biaxially-oriented nylon film according to claim 1, wherein the nylon 6 and metaxylylene adipamide are contained in the thermal hysteresis material at ratios of 60 to 85 parts by mass and 15 to 40 parts by mass, respectively.

3. A method of manufacturing a biaxially-oriented film according to claim 1, said method comprising:
   biaxially-orienting unoriented raw film made from the nylon 6 and metaxylylene adipamide under a condition where an oriented ratio of the film in each of a machine direction and a transverse direction becomes 2.8 times or more; and
   heat-treating the raw film at a temperature between 160 and 200 degrees C. to manufacture said biaxially-oriented nylon film,
   wherein said biaxially-oriented nylon film has:
   a crystallinity degree of the film is in a range of 20 to 38 percent,
   an elongation ratio of the film in each of the machine direction, the transverse direction, a 45 degree direction, and a 135 degree direction, until a film rupture is 70 percent or more, the elongation ratio being measured in a tensile test, wherein the testing conditions include: a sample width of 15 mm; a distance between gauge points is 50 mm; and a tensile speed is 100 mm/min, and
   a stress ratio A ($\sigma_1/\sigma_2$) of a tensile stress $\sigma_1$ and a tensile stress $\sigma_2$ in a stress-strain curve obtained in the tensile test of the film is 2 or more in each of the four directions, the tensile stress $\sigma_1$ being a value at a point where the elongation ratio becomes 50 percent while the tensile stress $\sigma_2$ being a value at an yield point,
   wherein said film is made from a film forming material that contains a virgin material and a thermal hysteresis material, the virgin material being formed of nylon 6 and metaxylylene adipamide, the thermal hysteresis material being obtained by melt-kneading nylon 6 and metaxylylene adipamide and by setting the metaxylylene adipamide to have a melt point of 233 to 238 degrees C., and
   a hydrothermal shrinkage factor of the film is 3 to 20 percent in each of the machine direction and the transverse direction of said film when said film is retained in hot liquid of 95 degrees C. for thirty minutes, wherein the nylon 6 and metaxylylene adipamide are contained in the virgin material by ratios of 60 to 85 parts by mass and 15 to 40 parts by mass, respectively, and a content of the thermal hysteresis material is 5 to 40 percent by mass of the total amount of the film forming material.

4. The method according to claim 3, wherein the nylon 6 and metaxylylene adipamide are contained in the thermal hysteresis material at ratios of 60 to 85 parts by mass and 15 to 40 parts by mass, respectively.

* * * * *